United States Patent [19]
Whittaker et al.

[11] Patent Number: 5,636,035
[45] Date of Patent: Jun. 3, 1997

[54] METHOD AND APPARATUS FOR DUAL MODULATION LASER SPECTROSCOPY

[75] Inventors: Edward A. Whittaker, Hoboken; Hoi C. Sun, Plainsboro, both of N.J.

[73] Assignee: The Trustees of the Stevens Institute of Technology, Hoboken, N.J.

[21] Appl. No.: 480,030

[22] Filed: Jun. 7, 1995

Related U.S. Application Data

[63] Continuation of Ser. No. 150,855, Nov. 12, 1993, abandoned, which is a continuation-in-part of Ser. No. 767,497, Sep. 30, 1991, Pat. No. 5,267,019.

[51] Int. Cl.$^6$ .................................................. G01N 21/61
[52] U.S. Cl. ........................... 356/437; 250/343; 356/409
[58] Field of Search ................................. 356/409, 326, 356/324, 325, 343, 437, 300; 250/343; 372/32

[56] References Cited

U.S. PATENT DOCUMENTS

| | | | |
|---|---|---|---|
| 4,684,258 | 8/1987 | Webster | 356/409 |
| 4,730,112 | 3/1988 | Wong | 250/343 |
| 4,746,218 | 5/1988 | Lord, III | 356/437 |
| 4,749,276 | 6/1988 | Bragg et al. | 356/246 |
| 4,849,637 | 7/1989 | Cerff et al. | 250/345 |
| 4,883,963 | 11/1989 | Kemeny et al. | 250/339 |
| 4,897,548 | 1/1990 | Dome et al. | 250/343 |
| 4,934,816 | 6/1990 | Silver et al. | 356/409 |
| 4,937,448 | 6/1990 | Mantz et al. | 250/343 |

OTHER PUBLICATIONS

Carlisle et al., *Quantum Noise–Limited FM Spectroscopy with a Lead–Salt Diode Laser,* Applied Optics, vol. 28, No. 13, pp. 2567–2576, Jul. 1, 1989.

Silver et al., *Optical Interference Fringe Reduction in Laser Absorption Experiments,* Applied Optics, vol. 27, No. 10, pp. 1914–1916, May 15,1988.

Gehrtz et al., *Quantum–Limited Laser Frequency–Modulation Spectroscopy,* J. Opt. Soc. Am. B, vol. 2, No. 9, pp. 1510–1526, Sep. 1985.

Cassidy et al., *Harmonic Detection with Tunable Diode Lasers —Two–Tone Modulation,* Applied Physics, B 29, 279–285 (1982) no month.

Reid et al., *Sensitivity Limits of a Tunable Diode Laser Spectrometer, with Application to the Detection of $NO_2$ at the 100–ppt Level,* Applied Optics, vol. 19, No. 19, pp. 3349–3354 (Oct. 1980).

Bomse, *"Dual–Modulation Laser Line–Locking Scheme",* Applied Optics, vol. 30, No. 21; Jul. 20, 1991.

Sun et al "Combined Wavelength . . . Processing" Applied Optics vol. 32, No. 6, Feb. 20, 1993.

*Primary Examiner*—K. Hantis
*Attorney, Agent, or Firm*—Bell, Seltzer, Park & Gibson

[57] ABSTRACT

A method and apparatus for conducting laser absorption spectroscopy uses a frequency tunable laser aligned to pass a laser beam through a sample volume and to an optical detector. A two-step modulation is used to generate frequency components that may be used to both lock the tunable laser to the absorbance signal, and generate an output signal proportional to the absorbance signal. The method includes frequency modulating the tunable laser at a first frequency while further modulating the tunable laser with a triangular waveform having a second frequency, and generating a feedback control signal based upon an antisymmetrical signal demodulated from the optical detector using a first predetermined harmonic of the second frequency. The tunable laser is locked to the absorbance signal with the feedback control signal. An output signal proportional to the absorbance signal is generated using a symmetrical signal demodulated using a second predetermined harmonic of the second or triangular waveform frequency. The first and second predetermined harmonics are preferably consecutive harmonics.

8 Claims, 4 Drawing Sheets

METHOD AND APPARATUS FOR DUAL MODULATION LASER SPECTROSCOPY

RELATED APPLICATION

This application is a continuation of application Ser. No. 08/150,855, filed Nov. 12, 1993, now abandoned, which is a continuation-in-part of U.S. patent application Ser. No. 07/767,497 filed on Sep. 30, 1991, now U.S. Pat. No. 5,267,019.

FIELD OF THE INVENTION

The invention relates to the field of spectroscopy, and, more particularly, to a method and apparatus for laser absorption spectroscopy.

BACKGROUND OF THE INVENTION

As a technique for sensitive trace gas detection, laser absorption spectroscopy is attractive because of its simplicity and insensitivity to the environmental conditions of the absorbing species. Tunable diode laser (TDL) spectrometers are particularly suited to high sensitivity studies, in part because they may be frequency modulated to reduce low frequency laser noise and electronic noise. A typical spectrometer includes a frequency tunable laser for generating a laser beam which is directed through a sample cell and onto an optical detector. The signal received at the optical detector is demodulated to obtain the absorbance signal.

Unfortunately, sensitivity is usually severely limited by the presence of interference fringes (etalon fringes) which appear as the narrow bandwidth laser is tuned through the range of the desired absorbance signal. See, for example, Carlisle et al., *Quantum Noise-Limited FM Spectroscopy with a Lead-Salt Diode Laser*, Applied Optics, Vol. 28, No. 13, pp. 2567–2576, Jul. 1, 1989. The interference fringes are attributable to laser frequency dependent interference between pairs of parallel optical surfaces through which the laser beam must pass as it propagates from the laser, through the sample cell, and to the optical detector. The fringes may result from laser transmission through individual optical elements, such as windows or lenses, or through air and vacuum paths separated by the surfaces of different system elements. The reflections causing the interference fringes are extremely difficult to eliminate completely even with high quality anti-reflection coatings and careful optical alignment. These fringes, even when very weak, can easily overwhelm the absorbance signal from the sample volume.

Attempts have been disclosed to reduce the undesirable effects of such interference fringes. For example, U.S. Pat. No. 4,934,816 to Silver et al. discloses a mechanical approach to reducing interference fringes. A piezoelectric transducer translationally vibrates an active optical element, such as a mirror, in the optical path of the tunable laser. The interference fringes are then averaged over time to near zero using a sawtooth (triangle) waveform to drive the piezoelectric transducer that vibrates the optical element, so that each spatial position of the optical element is sampled with equal probability.

The Silver et al. patent also discloses that the fringe averaging effect may be obtained with a detection apparatus employing a lock-in amplifier referenced to the system modulation frequency which is asynchronous with respect to the vibration frequency of the active optical element. The most important consideration in choosing the vibration frequency of the active element according to the patent is that the vibration frequency be asynchronous with other system frequencies, particularly the lock-in reference frequency, so that fringe averaging can occur. See also Silver and Stanton, *Optical Interference Fringe Reduction in Laser Absorption Experiments*, Applied Optics, Vol. 27, No. 10, pp. 1914–1916, May 15, 1988.

Unfortunately, fast data acquisition cannot be performed with the Silver et al. technique, since averaging for a period longer than the period of the vibration frequency is required. Thus, the Silver et al. patent discloses mechanical modulation of the interference fringe at a very low frequency (less than about 100 Hz). Accordingly, the signal must be integrated to average out the fringes because the fringe signal is translated into very low frequency oscillation at the output of the lock-in amplifier. Moreover, the detection bandwidth of the spectrometer is limited to a very small range.

Another mechanical type approach to reducing interference fringes is disclosed in U.S. Pat. No. 4,684,258 to Webster. The Webster patent discloses a Brewster plate spoiler in the laser path downstream of the sample cell and operated by a controller for oscillating the spoiler back and forth about one axis. The oscillating spoiler cyclically varies the optical path length and creates standing waves in a second cavity exterior to the laser's inside cavity. The patent also discloses that for fringe averaging, the Brewster plate is preferably driven by a triangular wave oscillation signal which is several times the frequency of the free spectral range. Unfortunately, such a mechanical approach to fringe reduction is relatively complex, difficult to precisely control, and may not be fully satisfactory for removing unwanted interference fringes.

Other techniques have also been disclosed for attempting to reduce interference fringes in laser absorption spectroscopy. For example, an article by Carlisle, et al., *Quantum Noise-Limited FM Spectroscopy with a Lead-Salt Diode Laser*, Applied Optics, Vol. 28, No. 13, pp. 2567–2576, Jul. 1, 1989 discusses a two-tone frequency modulation technique for laser spectroscopy. The technique includes modulating the laser simultaneously at two arbitrary but closely spaced frequencies, and monitoring the beat tone between these two frequencies as the laser carrier and associated sidebands are tuned through a desired absorption line.

In the Carlisle et al. system, a conventional lead-salt diode is driven by superposition of three electrical signals. The signals are a DC current to forward bias the laser diode above threshold, a 1 KHz current ramp to repetitively sweep the laser output frequency across an absorption line of interest, and a two-tone radio frequency signal at a predetermined frequency using two radio frequency synthesizers and a double-balanced mixer. The 1 KHz current ramp and DC bias are adjusted in amplitude so that the output frequency of the laser just sweeps across the absorption line of interest. A low-pass filter is disclosed for removing interference fringes without significantly affecting the two-tone signal. However, if the free spectral range linewidth of the interference fringe is larger than or approximately equal to the absorption linewidth, the suppression of the fringe is severely limited. In addition, baseline noise cannot be eliminated because of the lowpass characteristic of the technique. Further disadvantages of the Carlisle et al. approach include a requirement for current ramping, and the requirement for a relatively complicated linear phase filter for recovering the absorbance signal. The approach is also not applicable when line locking is needed.

Other techniques using multiple beams are also known in the art. An article by Gehrtz et al., *Quantum-Limited Laser Frequency-Modulation Spectroscopy*, J. Opt. Soc. Am. B, Vol. 2, No. 9, pp. 1510–1526, Sept. 1985, describes frequency modulation spectroscopy including the difficulties associated therewith. In particular, the article discloses reduction of the residual amplitude modulation of the tunable laser by, for example, techniques using double laser beams.

An article by Cassidy et al. entitled *Harmonic Detection with Tunable Diode Lasers—Two-Tone Modulation*, Applied Physics, B 29, 279–285 (1982), discloses two-tone modulation to improve the sensitivity of tunable diode laser absorption spectrometers. A sinusoidal jitter modulation is applied having a predetermined phase and frequency to simultaneously minimize the fringe signal and increase the harmonic absorbance signal. Unfortunately, the fringe reduction technique is essentially lowpass in nature.

An article by Reid et al. entitled *Sensitivity Limits of a Tunable Diode Laser Spectrometer, with Application to the Detection of $NO_2$ at the 100-ppt Level*, Applied Optics, Vol. 19, No. 19, pp. 3349–3354 (October 1980) discloses that minima of interference fringes occur when the amplitude of the sinusoidal modulation of the tunable diode laser is exactly an integral number of the interference fringe spacings. The article discloses that jitter modulation of a symmetric sawtooth at a frequency of 300–500 Hz and an amplitude much smaller than the 3 KHz sinusoidal modulation used for the second harmonic detection can be used to sweep the diode laser wavelength back and forth over exactly one fringe. This sweep occurs many times during an integration period of a lock-in amplifier set to the second harmonic (6 KHz) of the sinusoidal modulation, and hence the fringes are electronically washed out. The small amplitude of the jitter modulation ensures that is has little effect on the $NO_2$ second harmonic absorption line shape.

Another application for laser spectroscopy is for analyzing and controlling plasma processing reactors, such as used for semiconductor processing. Such applications will require long term and short term laser frequency stability not available with conventional free-running lasers. This is especially true for use in low pressure processing where Doppler limited absorption linewidths of tens of megahertz may be encountered. Such narrow linewidths are of the same order of magnitude as the jitter broadened linewidth of a free-running laser. Furthermore, the high level of electrical noise generated by typical high power RF and microwave plasma sources exacerbates free-running laser frequency drift.

One approach to laser line locking is to divide the laser beam into a probe beam which passes through the gas sample under study, and a reference beam which is directed through a reference cell filled with a stable volume of the gas species under study. Since the reference cell is absorbance stable, the absorbance signal in the reference beam can be used to stabilize the laser frequency using any number of feedback schemes. See for example, Saito et al., "Frequency Modulation Noise and Linewidth Reduction in a Semiconductor Laser by Means of Negative Frequency Feedback Technique," Appl. Phys. Lett. 46, 3–5 (1985). Unfortunately, when probing transient species which are difficult to generate and detect in the first place, this reference beam approach is not satisfactory or cost efficient, and often impossible to practically implement.

Another approach for performing laser absorption spectroscopy is described in "*Dual-Modulation Laser Line-Locking Scheme*", by Bomse, Applied Optics, Vol. 30, No. 21; Jul. 20, 1991. The Bomse article describes a modulation approach using two levels of modulation to obtain a pair of measurement and control signals. The pair of signals originates in the first level (high frequency) of modulation. Accordingly, this approach limits the choice of FM frequency to values less than one half the bandwidth of the optical detector since second harmonic detection is required. Furthermore, it prevents choosing the FM frequency to optimize the overall signal amplitude. The second level (low frequency) of modulation is used only to eliminate baseline drift appearing after the first level of modulation. The laser frequency swing for this level of modulation must also be chosen to match the absorbance signal linewidth.

SUMMARY OF THE INVENTION

It is therefore an object of the invention to provide a method and apparatus for conducting laser absorption spectroscopy that substantially reduces unwanted interference fringes and removes baseline drift to thereby increase measurement sensitivity, particularly during plasma processing which generates a large amount of electrical noise.

It is another object of the invention to provide a method and apparatus for conducting laser absorption spectroscopy that may be readily used for detection of transient chemical species, such as generated, for example, during plasma etching.

It is yet another object of the invention to provide a method and apparatus for conducting laser absorption spectroscopy for a low pressure sample, such as during plasma processing, that may generate relatively narrow absorbance signals having linewidths on the order of tens of MHz.

These and other objects, advantages and features of the present invention are provided by a method for conducting laser absorption spectroscopy using a frequency tunable laser aligned to pass a laser beam through a sample volume and to an optical detector, wherein a two-step modulation is used to generate frequency components that may be used to both lock the tunable laser to the absorbance signal, and generate an output signal proportional to a value of the absorbance signal. More particularly, the method includes the steps of frequency modulating the tunable laser at a first frequency while further modulating the tunable laser with a triangular waveform having a second frequency, and generating an antisymmetrical feedback control signal by demodulating a signal from the optical detector using a first predetermined harmonic of the second or triangular waveform frequency. The tunable laser is locked to an absorbance signal with the feedback control signal. An output signal proportional to the absorbance signal is generated by demodulating the signal from the optical detector using a second predetermined harmonic of the triangular waveform frequency. As would be readily understood by those skilled in the art, the symmetry and antisymmetry is determined relative to the center of the absorbance signal resonance point.

The dual modulation scheme, including the triangular waveform modulation, removes any baseline laser drift caused by residual amplitude modulation from the first modulation step. In addition, unwanted interference fringes are also readily removed from the absorption induced signal as described in U.S. patent application Ser. No. 07/767,497 filed Sep. 30, 1991, now U.S. Pat. No. 5,267,019, and assigned to the assignee of the present invention. The entire disclosure of the patent application is incorporated herein by reference.

As would be readily understood by those skilled in the art, an antisymmetrical signal may be generated by using a predetermined harmonic of the triangular waveform, while a consecutive harmonic produces the symmetrical signal that is proportional to the absorbance signal. The choice of consecutive harmonics also facilitates the use of two conventional lock-in amplifiers to demodulate a signal received by the optical detector. Moreover, the first predetermined harmonic is preferably selected to be the second harmonic of the second or triangular waveform frequency, while the second predetermined harmonic is preferably selected to the fundamental or first harmonic of the second frequency.

In a typical laser spectroscopy application, the laser beam is further aligned to pass through one or more pairs of windows, such as walls of a sample cell or plasma processing chamber windows. Accordingly, the step of further modulating the tunable laser with a triangular waveform preferably includes modulating the tunable laser with the triangular waveform having a predetermined amplitude to produce from a periodic interference fringe generated by the one or more pairs of windows a signal having reduced components near the absorbance signal.

For enhanced detection sensitivity, the step of modulating the tunable laser at a first frequency preferably includes modulating the tunable laser at a frequency substantially the same as a predetermined linewidth of the absorbance signal. In other words, the ratio of the first frequency to the linewidth of the absorbance signal is preferably in the range of about 1 to 4.

The step of generating the feedback control signal preferably also includes integrating the demodulated antisymmetrical signal. Since real time monitoring of a plasma processing chamber, for example, requires measurement times as long as several tens of minutes, the integrator serves to remove long term drifts from the tunable laser. In other words, the integrator holds an offset between the laser frequency and the absorbance signal constant. The low pass nature of the integrator also removes any transients induced by the plasma to prevent unlocking of the tunable laser from the absorbance signal.

The apparatus according to the invention includes a conventional frequency tunable laser aligned to pass a laser beam through the sample volume and an optical detector downstream from the sample volume. The apparatus further includes first modulator means for frequency modulating the tunable laser at a first frequency, and second modulator means for further modulating the tunable laser with a triangular waveform having a second frequency. Laser locking means is coupled to the tunable laser and generates a feedback control signal to lock the laser to an absorbance signal from the sample volume. The laser locking means includes first demodulator means for demodulating an antisymmetrical signal from the optical detector using a first predetermined harmonic of the triangular waveform frequency to thereby generate the feedback control signal.

The apparatus also includes output signal generating means for generating an output signal proportional to the absorbance signal from the sample volume. The output signal generating means includes second demodulator means for demodulating a symmetrical signal from the optical detector using a second predetermined harmonic of the triangular waveform frequency.

The first and second demodulator means are preferably provided, in part, by respective first and second lock-in amplifiers for demodulating the signal from the optical detector. Preferably, the lock-in amplifiers are set for consecutive harmonics of the second or triangular waveform frequency. More preferably, the first lock-in amplifier may be set to second harmonic of the triangular waveform frequency, while the second lock-in amplifier is set for the fundamental or first harmonic.

The apparatus according to the invention is preferably used in the area of plasma processing, such as for manufacturing semiconductors, because of the high sensitivity and enhanced immunity to optical interference fringes and electrical noise. Accordingly, the tunable laser may be coupled through windows of the processing chamber. The peak-to-peak amplitude of the triangular waveform may then be set to produce from a periodic interference fringe generated by the windows a signal having reduced components near the absorption induced signal.

DETAILED DESCRIPTION OF THE PREFERRED EMBODIMENTS

The present invention will now be described more fully hereinafter with reference to the accompanying drawings and illustrative examples, in which preferred embodiments of the invention are shown. This invention may, however, be embodied in many different forms and should not be construed as limited to the embodiments set forth herein. Rather, applicants provide these embodiments so that this disclosure will be thorough and complete, and will fully convey the scope of the invention to those skilled in the art. Like numbers refer to like elements throughout.

Figure 1:
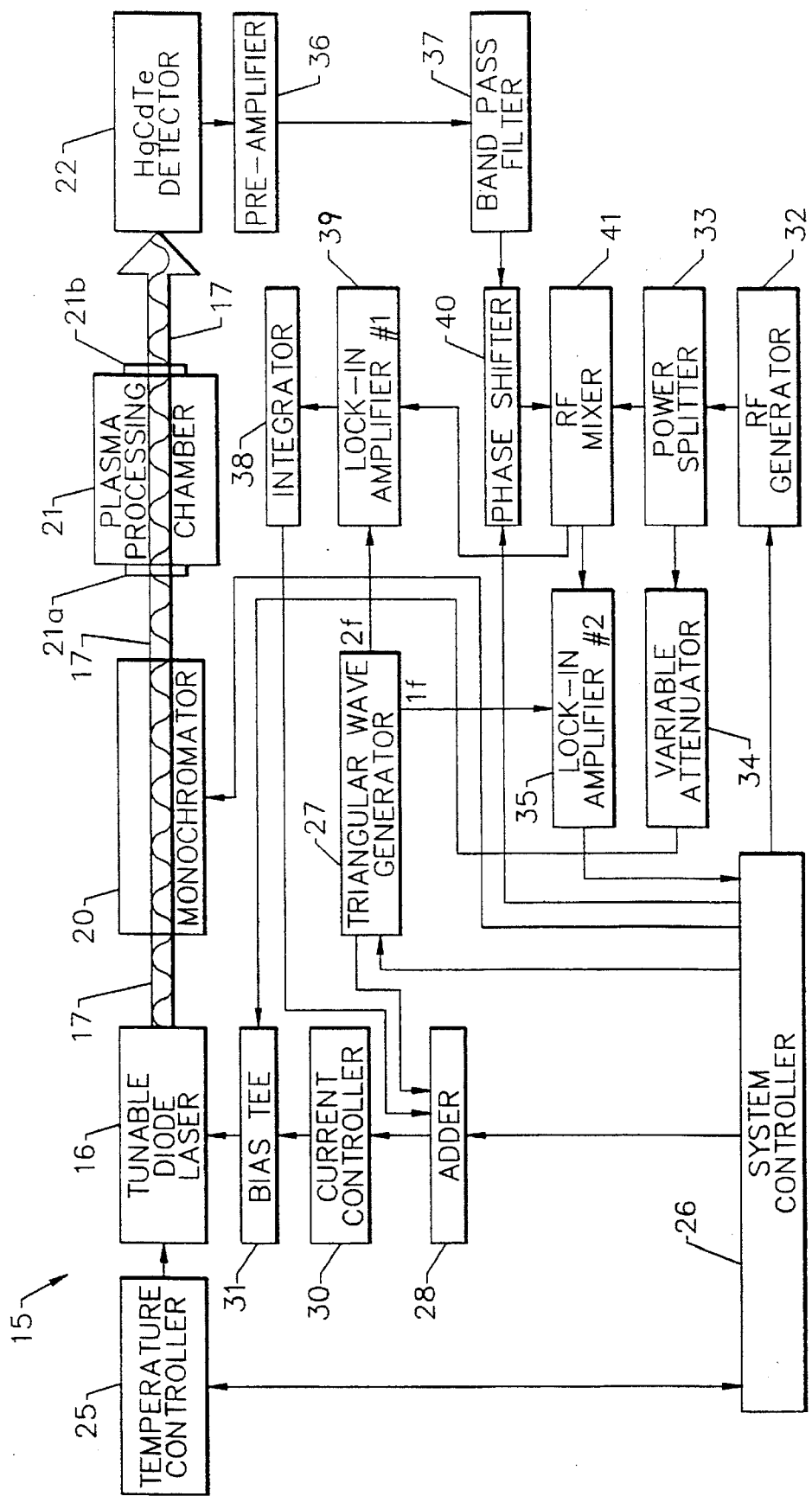
FIG. 1 is a schematic diagram of the laser absorption spectroscopy apparatus according to the present invention.

There is shown in FIG. 1 an apparatus for performing laser absorption spectroscopy according to the invention generally designated by reference numeral 15 and alternatively referred to herein as a spectrometer. The spectrometer 15 includes a tunable diode laser 16 for generating a laser beam 17 which passes through a mode selection monochromator 20 and through a pair of windows 21a, 21b of a plasma processing chamber 21 in the illustrated embodiment. Those of skill in the art will recognize that any cell for containing a gas sample may be used. As will also be readily understood by those of skill in the art, the windows 21a, 21b or other optical elements have a tendency to introduce periodic interference fringes that may mask measurement of a desired absorbance signal. The present invention advantageously removes the unwanted periodic interference fringes from the portion of the spectrum of the absorbance signal, as explained in greater detail below.

An optical detector 22 is positioned downstream from the plasma processing chamber 21. The tunable laser diode 16 may be a conventional tunable laser model L5615-880 available from Laser Photonics Inc., Orlando, Fla. The optical detector 22 may be a conventional photovoltaic HgCdTe detector of the type available from New England Research, Sudbury, Mass.

The tunable diode laser 16 is temperature compensated by a temperature controller 25 which is also interfaced to the spectrometer controller 26. The spectrometer controller 26 is preferably a programmable computer that may also interface to other components, such as through conventional stepper motors for example, as would be readily understood by those skilled in the art.

The frequency of the tunable laser 16 is readily controlled through control of the injection current. An RF generator 32 provides a first level of modulation to the tunable laser 16 through a power splitter 33, variable attenuator 34, and bias tee 31 as would be readily understood by those skilled in the art. The RF generator 32 is preferably capable of providing modulation at a first frequency compatible with a linewidth of a desired absorbance signal to be measured. The first frequency is preferably in the range of about 1 to 4 times the linewidth of the desired absorbance signal. Accordingly, high detection sensitivity may be achieved. A portion of the power from the RF generator 32 is also delivered to the RF mixer 41 for demodulation as would be readily understood by those skilled in the art.

A triangular waveform generator 27 operated at a second frequency and with a predetermined peak-to-peak amplitude provides a second level of modulation to the tunable laser 16. The triangular waveform generator is preferably capable of generating a triangular waveform having a frequency in the range of 1 KHz to about 1 MHz. The triangular waveform generator 27 is coupled through an adder 28 to feed the current controller 30 which, in turn, feeds the bias tee 31 to modulate the tunable laser 16. The bias tee 31 may be of the type available from Triangle Microwave, East Hanover, N.J. under the Model Number EP-18. The RF generator 32 may be of the type available from Hewlett Packard, Paramus, N.J. under the Model Number HP8565B.

The demodulator portion of the spectrometer 15 includes a pre-amplifier 36 coupled to the optical detector 22. The signal from the pre-amplifier 36 is fed through a bandpass filter 37 and a controllable phase shifter 40 to the RF mixer 41. The phase shifter 40 is preferably of the type available from Merimac Industries Inc., West Caldwell, N.J. offered under the Model Number PEW-3-30. The RF mixer 41 may preferably be a Model Number M6F offered by Watkins-Johnson Company, Palo Alto, Calif.

Figure 2:
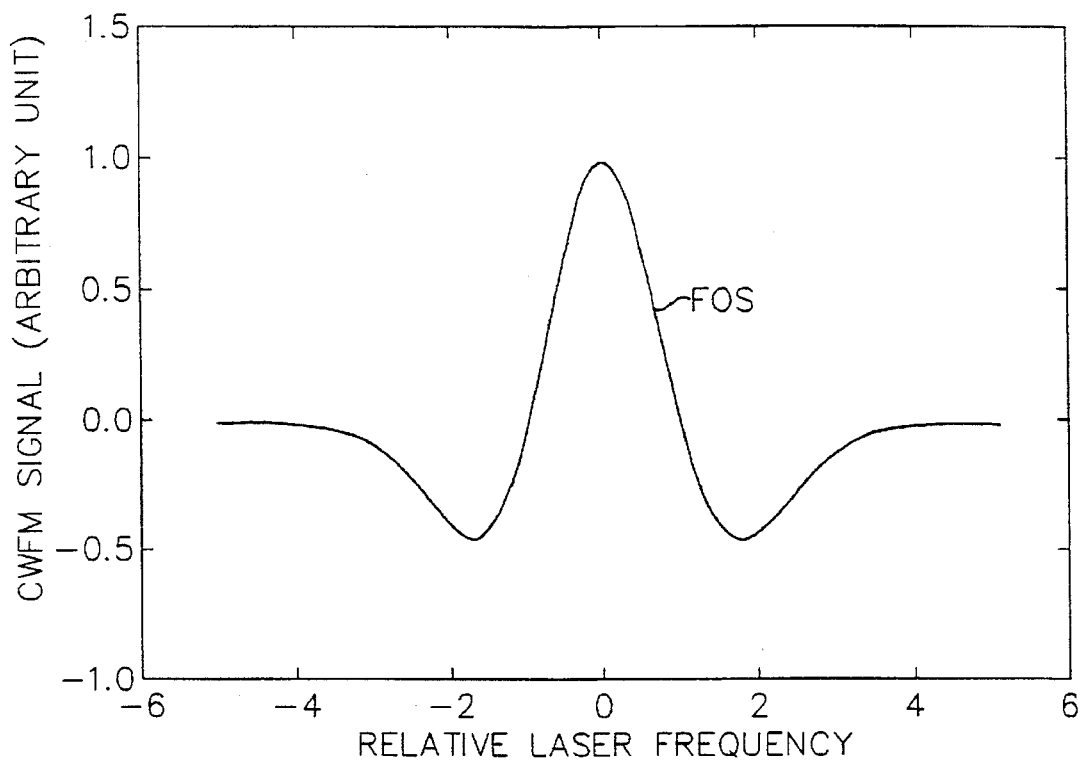
FIG. 2 is a graph of a calculated waveform for a typical demodulated first order absorbance signal produced according to the present invention.
Figure 3:
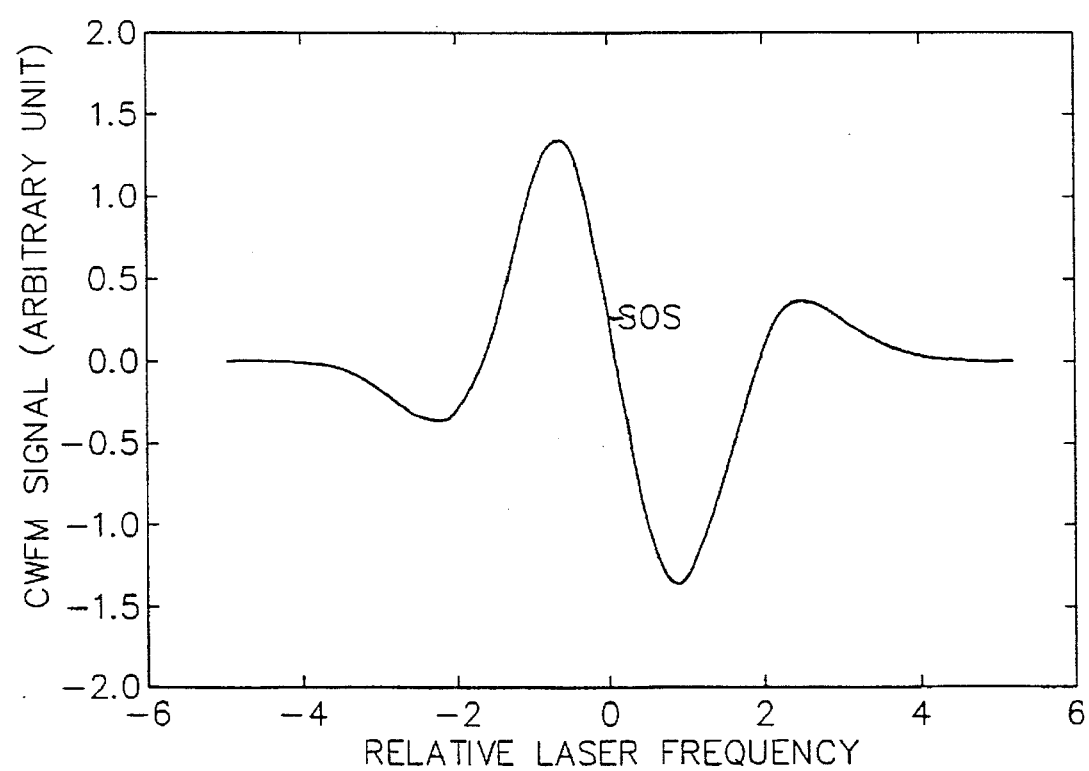
FIG. 3 is a graph of a calculated waveform for a typical demodulated second order absorbance signal produced according to the present invention.

According to the invention, a two-step modulation is used to generate frequency components that may be used to both lock the tunable laser 16 to the absorbance signal and generate an output signal proportional to the absorbance signal. As shown in FIG. 2, the first order signal (FOS) is seen to be symmetrical and reach a maximum at the resonant peak of the absorbance signal, while in FIG. 3 the second order signal (SOS) is seen to be zero and antisymmetric at that point. The signal-to-background ratio (including any residual false absorption features and noise) is of the same order of magnitude for both orders. Thus, the FOS may be used to provide the quantitative information of the species being detected, while the SOS may be used to lock-in the laser frequency.

Laser locking means is provided according to the invention for generating a feedback control signal to lock the tunable laser 16 to an absorbance signal. The laser locking means preferably includes first demodulator means for demodulating an antisymmetrical signal from the optical detector 22 using a first predetermined harmonic of the second or triangular waveform frequency. A first lock-in amplifier 39 of a conventional type may be used to provide the first demodulator means as would be readily understood by those skilled in the art.

The apparatus 15 also includes output signal generating means for generating an output signal proportional to the absorbance signal. The output signal generating means preferably includes second demodulator means for demodulating a symmetrical signal from the optical detector 22 using a second predetermined harmonic of the second frequency.

In other words and as would be readily understood by those skilled in the art, the first demodulator means preferably includes means for generating a first predetermined order derivative of the signal from the optical detector 22 to thereby generate the antisymmetrical feedback control signal, while the second demodulator means preferably includes means for generating a second predetermined order derivative to thereby generate the symmetrical output signal proportional to the absorbance signal.

The second demodulator means is preferably also provided by a second conventional lock-in amplifier 3B demodulating the signal at a second predetermined harmonic of the triangular waveform frequency. The first and second lock-in amplifiers 39, 35 respectively are preferably driven by consecutive harmonics of the second or triangular waveform frequency. In the illustrated embodiment, the first lock-in amplifier is driven by the second harmonic ($2f$) of the second frequency, while the second lock-in amplifier 35 is driven by the fundamental or first harmonic ($1f$) of the second frequency.

The pair of windows 21a, 21b of the plasma processing chamber may produce an undesirable interference fringe. Accordingly, the second modulator means preferably includes means for modulating the tunable laser with a triangular waveform having a predetermined peak-to-peak amplitude to produce from the periodic interference fringe generated by the pair of windows a signal having reduced components near the absorption induced signal.

The laser locking means also preferably includes an integrator 38 for integrating the demodulated antisymmetrical signal from the optical detector 22 and the first lock-in amplifier 39. Since real time monitoring of a plasma processing chamber 21, for example, requires measurement times as long as several tens of minutes, the integrator 38 serves to remove long term drifts from the tunable laser 16. In other words, the integrator 38 holds constant an offset between the laser frequency and the absorbance signal. The low pass nature of the integrator 38 also removes any transients induced by the plasma to prevent unlocking of the tunable laser 16 from the absorbance signal.

The method according to the invention is for conducting laser absorption spectroscopy using a frequency tunable laser 16 aligned to pass a laser beam 17 through a sample volume, such as a plasma processing chamber 21, and to an optical detector 22, as described above with respect to the apparatus according to the invention. The method includes a two-step modulation to generate frequency components that may be used to both lock the tunable laser to the absorbance signal, and generate an output signal proportional to a the absorbance signal. More particularly, the method includes the steps of frequency modulating the tunable laser 16 at a first frequency, while further modulating the tunable laser with a triangular waveform having a second frequency, and generating a feedback control signal by demodulating an antisymmetrical signal from the optical detector 22 using a first predetermined harmonic of the second frequency. The tunable laser 16 is locked to the absorbance signal by the feedback control signal. An output signal proportional to the absorbance signal is generated by demodulating a symmetrical signal from the optical detector using a second predetermined harmonic of the second frequency.

As would be readily understood by those skilled in the art, demodulating the signal from the optical detector 22 using a first predetermined harmonic of the second frequency generates a first predetermined order derivative of the signal from the optical detector. Correspondingly, demodulating at a second predetermined harmonic generates a second predetermined order derivative.

The dual modulation scheme including the triangular waveform modulation removes any baseline laser drift caused by residual amplitude modulation from the first modulation step. In addition, unwanted interference fringes are also readily removed from the absorbance signal.

The first predetermined harmonic and the second predetermined harmonic are preferably selected to be consecutive harmonics of the second frequency so that conventional lock-in amplifiers 39, 35 may be readily used to demodulate the signal received by the optical detector 22. Moreover, the first predetermined harmonic is preferably selected to be the second harmonic of the second frequency, while the second predetermined harmonic is preferably selected to the fundamental or first harmonic of the second frequency.

In a typical laser spectroscopy application, the laser beam 17 is further aligned to pass through one or more pairs of windows 21a, 21b, such as included in a sample cell or a plasma processing chamber 21. Accordingly, the step of further modulating the tunable laser 16 with a triangular waveform preferably includes modulating the tunable laser with the triangular waveform having a predetermined amplitude to produce from a periodic interference fringe generated by the one or more pairs of windows a signal having reduced components near the absorbance signal.

For enhanced detection sensitivity, the step of modulating the tunable laser 16 at a first frequency preferably includes modulating the tunable laser at a frequency substantially the same as a predetermined linewidth of the absorbance signal. The step of generating the feedback control signal preferably also includes integrating the antisymmetrical signal demodulated from the optical detector 22.

The invention is further described in the following examples, which are intended for illustration purposes.

EXAMPLE 1

To check the validity of the locking scheme, two series of experiments were performed using an apparatus 15 similar to that shown schematically in FIG. 1. A separate sample cell, not shown, was positioned upstream from the plasma processing chamber 21 for the experiments.

The integrator 38 and the first lock-in amplifier 39 produce a feedback control signal fed back to the laser 16 as an extra external modulation. The FM or first frequency of modulation was chosen to be 40 MHz to maximize detection sensitivity for carbonyl sulfide (OCS) and sulfur hexafluoride ($SF_6$) for which the Doppler linewidths are 40 MHz and 29 MHz, respectively. The time constants of the integrator 38 and the first lock-in amplifier 39 were set to 1 millisecond to obtain the fastest feedback available from the apparatus 15 so as to cover the 60 Hz and 120 Hz drift caused by power line fluctuations.

The first series of experiments was designed to test the locking scheme in a typical plasma processing electrical environment. In order to obtain a constant absorbance signal, the diode laser beam 17 was first passed through a gas cell, not shown, containing approximately 1 Torr of OCS. After passing through this cell, the beam 17 then passed through the windows 21a, 21b of a plasma processing chamber 21 operated with an argon discharge, but otherwise free of any absorption resonances at the diode laser 16 wavelength.

Finally, the laser beam 17 was detected using a New England Research Center model MPV11-0.5-B60 HgCdTe photodetector 22 operated in photovoltaic mode. The laser 16 was tuned to an OCS absorption peak near 870 $cm^{-1}$ resulting in an absorbance of about 1% at line center. The FM modulation index and the triangular waveform amplitude were set at arbitrary values while the triangular waveform frequency used was 6 KHz. An absorbance equivalent noise level of $2 \times 10^{-5}$ was observed on the photocurrent with the plasma discharge turned off and the gas cell evacuated.

This level of absorbance equivalent noise was about ten times higher than the detector thermal noise background and was believed to be mainly due to the small window size of the reference cell used. The small window sized lowered the focusable laser power by a large factor. When the plasma discharge was turned on, peak-to-peak RF signals in excess of 3 V were found in a nearby chassis ground indicative of the high electrical noise levels generated in proximity to the plasma processing chamber 21.

FIGS. 4a-6b show relative absorbance data obtained by monitoring the first order signal from the second lock-in amplifier 35. The data represented by the waveforms of FIGS. 4a, 5a, and 6a were obtained under three different environmental conditions and with the diode laser in the free-running or unlocked mode. The data represented by the waveforms of FIGS. 4b, 5b, and 6b were obtained using respective similar conditions as those in FIGS. 4a, 5a, and 6a, but with the laser 16 locked to the OCS absorption line.

Figure 4A:
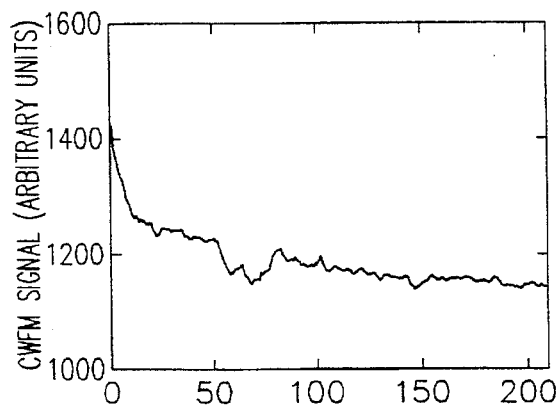
FIGS. 4a and 4b are graphs of demodulated first order absorbance signals measured as described in Example 1 with the plasma processing chamber turned off and the tunable laser free-running and locked, respectively.
Figure 4B:
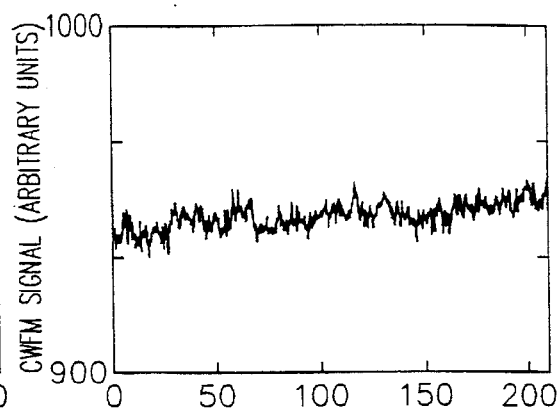

In FIGS. 4a and 4b, the OCS absorption was monitored with the plasma etcher discharge turned off, with the laser 16 in the unlocked mode and the locked mode, respectively. The graphs show the change in signal level for a period of 200 s using a lock-in bandwidth of 300 ms. The unlocked signal (FIG. 4a) shows a slow drift with fluctuations as a result of the laser 16 frequency drifting through the OCS resonance. The locked signal (FIG. 4b) on the other hand is stable and shows random fluctuations of about 0.3%. This fluctuation is only slightly larger than the 0.25% observed in the photocurrent with no absorption present at all.

In the next pair of data sets (FIGS. 5a and 5b), the same absorbance was monitored with the argon discharge turned on and with the laser 16 unlocked and locked, respectively. The signal from the unlocked laser shows large swings in signal size and is essentially unusable. Fluctuations on the locked signal, however, are only slightly larger than those taken in the plasma off environment.

Figure 5A:
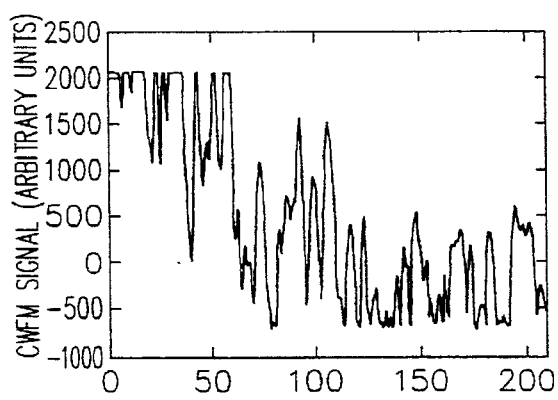
FIGS. 5a and 5b are graphs of demodulated first order absorbance signals measured as described in Example 1 with the plasma processing chamber turned on and the tunable laser free-running and locked, respectively.
Figure 5B:
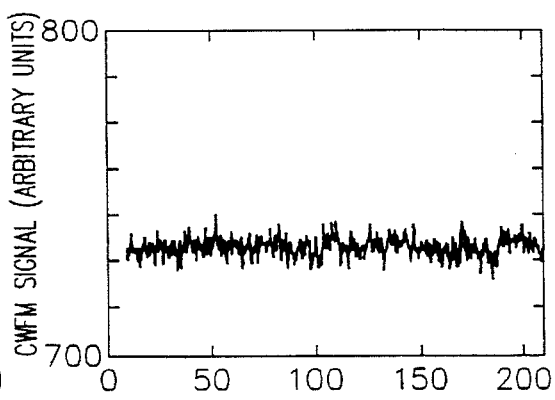
Figure 6A:
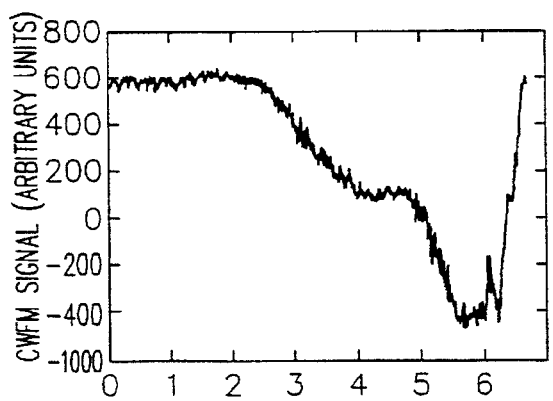
FIGS. 6a and 6b are additional graphs of demodulated first order absorbance signals measured as described in Example 1 with the plasma processing chamber turned on and the tunable laser free-running and locked, respectively.
Figure 6B:
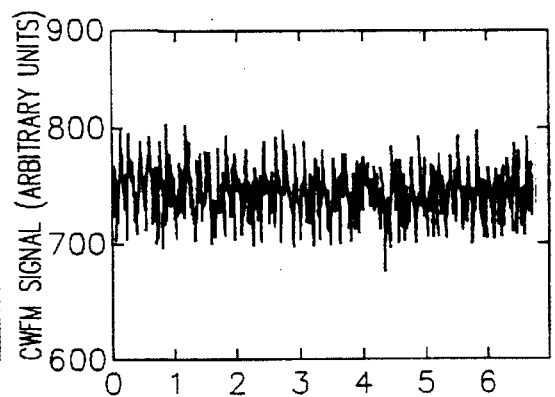

The locking circuit is working hard to hold the stability as shown in FIG. 5b, however. The integrated feedback signal was monitored with an oscilloscope and was found to contain a 120 Hz signal with a current swing corresponding to 120 MHz of laser frequency correction. This correction is three times as large as the Doppler broadened absorbance line and accounts for the large signal oscillations of the free running laser. In addition the average laser drive current drifted slowly from 180 mA to 184 mA, corresponding to a 1.2 GHz laser frequency drift.

In the final pair of data sets (FIGS. 6a and 6b), the time constant of the second lock-in amplifier 35 was reduced to 1 ms and data were collected for about 6 seconds. The unlocked laser still shows large excursions in amplitude while the locked laser signal remained stable, but with an increase in fluctuation amplitude. If the fluctuations in the data of FIG. 5b were due entirely to random laser frequency jitter and detector noise, the fluctuation level should increase by the square root of the time constant ratio of 17.3, which is indeed close to the observed factor of 20 increase.

EXAMPLE 2

As a practical demonstration of the present invention, a second set of experiments was performed on an industrial grade RF triode reactor 21 operating with a $SF_6$ discharge etching a 4" diameter silicon wafer. $SF_6$ starting base pressure and flow rate were set at 30 mTorr and 30 sccm, respectively. The laser beam 17 was aligned to pass through the reactor 21 via a pair of ZnSe windows and was tuned to a moderately strong absorbance peak in the tail of the $v_3$ band of $SF_6$, at a frequency of 920 cm$^{-1}$. The laser beam probed an approximately 10" column in the plasma discharge. The optical alignments, FM modulation frequency (40 MHz), modulation index ($\approx$1), FM demodulation phase (quadrature), and triangular waveform frequency (10 KHz) and amplitude (corresponds to 50 MHz peak-to-peak laser frequency swing) were chosen to optimize detection sensitivity. A measured noise equivalent absorbance of $5\times10^{-7}$ was obtained for a 1 Hz detection bandwidth.

To estimate the amount of frequency control needed for this arrangement, a 6 GHz laser frequency scan was monitored both before and after the plasma discharge was turned on. A slow 4 GHz spectral shift was observed immediately after the discharge was turned on. It is believed, without wishing to be bound thereto, that this was due to a permanent offset induced in the laser electronics by the plasma reactor 21 and which caused the lasing conditions of the laser diode 16 to change slowly. It is precisely such offsets that necessitate integrated feedback according to the present invention. It is estimated that the differential absorbance of the $SF_6$ while the discharge was on was $1.8\times10^{-4}$. The time constant of the integrator 38 and the first lock-in amplifier 39 was again set to 1 ms. The time constant of the second lock-in amplifier 35 (absorbance measurement) was set to 300 ms.

Figure 7:
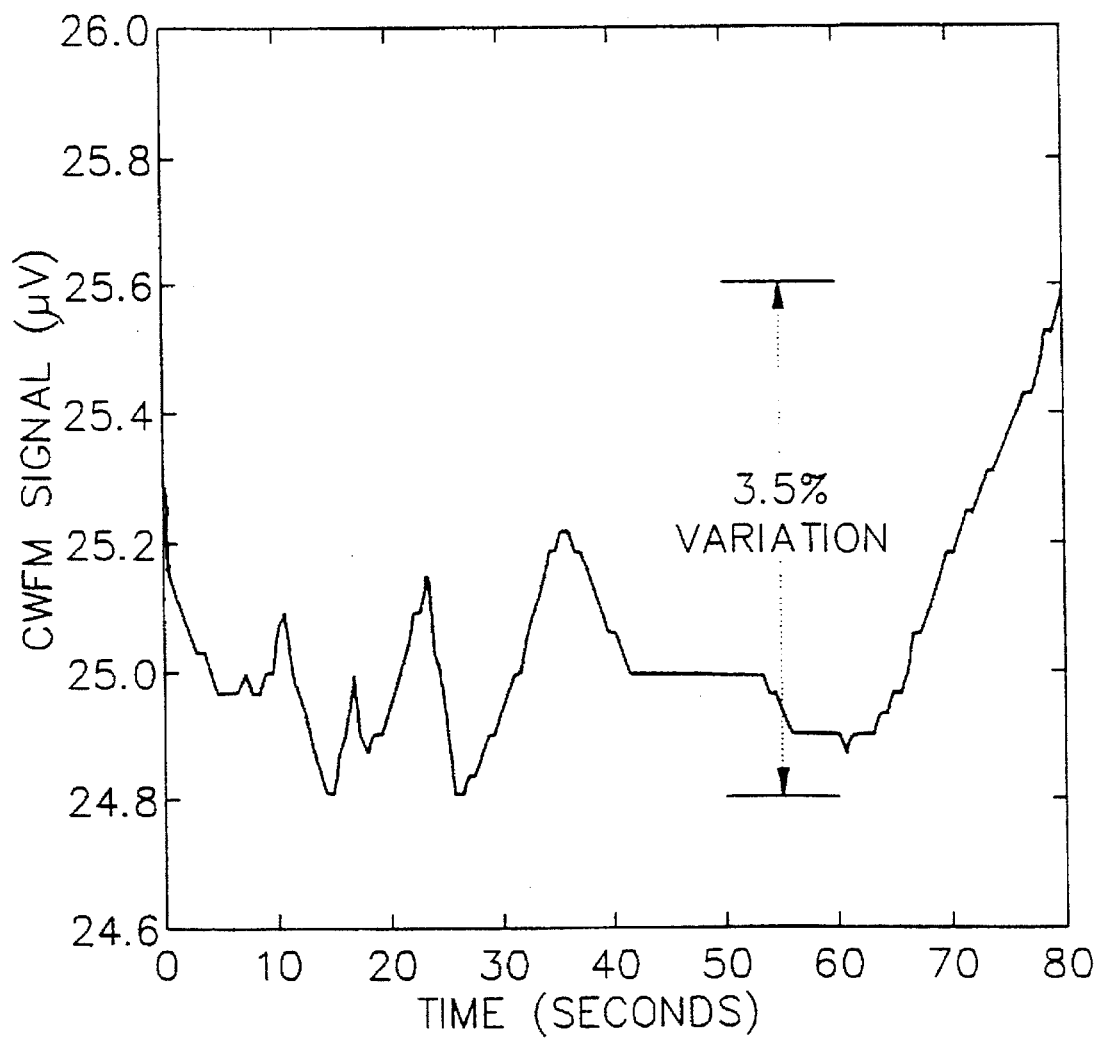
FIG. 7 is a graph of a measured absorbance signal as described in Example 2.

Typical data obtained with the laser 16 locked are plotted in FIG. 7. The 3.5% variation of the signal reflects actual absorbance changes during the course of the measurement. In this case, it is theorized without wishing to be bound thereto, that the changes are related to the actual silicon etching process as the signal amplitude was essentially constant when the discharge was operated without the silicon wafer present. Laser unlocking was observed when the differential absorbance was lowered to roughly $7\times10^{-6}$ which is the working limit of the illustrated locking circuit. In a separate experiment, the laser was locked continuously to a peak with differential absorbance of $10^{-4}$ for 5 hours.

While frequency modulation spectroscopy is described in detail herein, it would be readily understood by those skilled in the art the invention may be used in conjunction with conventional wavelength modulation, for example. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A method for laser absorption spectroscopy using a frequency tunable laser aligned to pass a laser beam through a sample volume and to an optical detector, said method comprising the steps of:

generating a detected absorbance signal at an output of the optical detector;

frequency modulating the tunable laser with a modulating signal having a first frequency;

demodulating the detected absorbance signal with a signal having a periodic component thereof with a frequency equal to a fundamental frequency of the modulating signal to produce a first level demodulated absorbance signal;

while further modulating the tunable laser by:

generating an antisymmetric waveform having a second frequency;

demodulating the first level demodulated absorbance signal with a signal having a periodic component thereof with a frequency equal to the frequency of a first predetermined harmonic of the antisymmetric waveform to produce a second level demodulated absorbance signal;

generating a feedback control signal by integrating the second level demodulated absorbance signal; and adjusting a drive current to the tunable laser based on the antisymmetric waveform and the feedback control signal to thereby lock the tunable laser to the detected absorbance signal; and generating an output signal proportional to the detected absorbance signal by demodulating the first level demodulated absorbance signal with a signal having a periodic component thereof with a frequency equal to the frequency of a second predetermined harmonic of the antisymmetric waveform but which is unequal to the frequency of the first predetermined harmonic of the antisymmetric waveform.

2. A method according to claim 1 further comprising the step of selecting the first predetermined harmonic and the second predetermined harmonic to be consecutive harmonics of the antisymmetric waveform.

3. A method according to claim 2 wherein the step of selecting the first predetermined harmonic comprises selecting same to be a second harmonic of the antisymmetric waveform, and wherein the step of selecting the second predetermined harmonic comprises selecting same to be a fundamental harmonic of the antisymmetric waveform.

4. A method according to claim 1 further comprising the step of aligning the frequency tunable laser to pass through one or more pairs of windows, and Wherein the step of generating an antisymmetric waveform comprises generating a triangular waveform having a predetermined amplitude so that a periodic interference fringe generated by the one or more pairs of windows has reduced components near the detected absorbance signal.

5. A method according to claim 1 wherein the step of frequency modulating the tunable laser at a first frequency comprises modulating the tunable laser at a frequency substantially the same as a predetermined linewidth of the detected absorbance signal to thereby enhance detection sensitivity.

6. An apparatus for performing laser absorption spectroscopy on a sample volume, said apparatus comprising:

a frequency tunable laser aligned to pass a laser beam through the sample volume;

an optical detector downstream from the sample volume for generating a detected absorbance signal at an output thereof;

first modulator means connected to said tunable laser for frequency modulating the tunable laser with a modulating signal having a first frequency;

means, responsive to said first modulator means, for demodulating the detected absorbance signal with a signal having a periodic component thereof with a frequency equal to a fundamental frequency of the modulating signal to produce a first level demodulated absorbance signal;

second modulator means connected to said tunable laser for further modulating the tunable laser, said second modulator means comprising means for generating an antisymmetric waveform having a second frequency;

means, operatively connected to said antisymmetric waveform generating means, for demodulating the first level demodulated absorbance signal with a signal having a periodic component thereof with a frequency equal to the frequency of a first predetermined harmonic of the antisymmetric waveform to produce a second level demodulated absorbance signal;

means, responsive to the second level demodulated absorbance signal, for generating a feedback control signal by integrating the second level demodulated absorbance signal; and means, responsive to said antisymmetric waveform generating means and said feedback control signal generating means, for adjusting a drive current to said tunable laser to thereby lock said tunable laser to the detected absorbance signal; and output signal generating means for generating an output signal proportional to the detected absorbance signal, said output signal generating means including means, operatively connected to said antisymmetric waveform generating means, for demodulating the first level demodulated absorbance signal with a signal having a periodic component thereof with a frequency equal to the frequency of a second predetermined harmonic of the antisymmetric waveform but which is unequal to the frequency of the first predetermined harmonic of the antisymmetric waveform.

7. An apparatus according to claim 6 wherein said means for demodulating the first level demodulated absorbance signal with a signal having a periodic component thereof with a frequency equal to the frequency of a first predetermined harmonic of the antisymmetric waveform comprises a first lock-in amplifier and wherein said means for demodulating the first level demodulated absorbance signal with a signal having a periodic component thereof with a frequency equal to the frequency of a second predetermined harmonic of the antisymmetric waveform comprises a second lock-in amplifier, and wherein the first predetermined harmonic and the second predetermined harmonic are consecutive harmonics of the antisymmetric waveform.

8. An apparatus according to claim 7 wherein said first predetermined harmonic is a second harmonic of the antisymmetric waveform, and wherein said second predetermined harmonic is a fundamental harmonic of the antisymmetric waveform.

* * * * *